(12) United States Patent
Cui et al.

(10) Patent No.: US 12,345,624 B1
(45) Date of Patent: Jul. 1, 2025

(54) PISTON PIN HOLE FRICTION AND WEAR TEST AND TORQUE MEASUREMENT DEVICE

(71) Applicant: Shanghai Jiao Tong University, Shanghai (CN)

(72) Inventors: Yi Cui, Shanghai (CN); Lining Gao, Shanghai (CN); Shuo Liu, Shanghai (CN); Yan Fu, Shanghai (CN); Zhaohui Xu, Shanghai (CN)

(73) Assignee: Shanhai Jiao Tong University, Shanghai (CN)

( * ) Notice: Subject to any disclaimer, the term of this patent is extended or adjusted under 35 U.S.C. 154(b) by 0 days.

(21) Appl. No.: 18/987,397

(22) Filed: Dec. 19, 2024

(30) Foreign Application Priority Data

Jan. 2, 2024 (CN) .......................... 202410001402.7

(51) Int. Cl.
*G01N 19/02* (2006.01)
(52) U.S. Cl.
CPC .................................... *G01N 19/02* (2013.01)
(58) Field of Classification Search
CPC ................................ G01N 3/56; G01N 19/02
USPC .............................................................. 73/9
See application file for complete search history.

(56) References Cited

FOREIGN PATENT DOCUMENTS

| CN | 102175544 A |   | 9/2011 |   |
|----|-------------|---|--------|---|
| CN | 112697625 A | * | 4/2021 | ............... G01N 3/38 |
| CN | 113176162 A |   | 7/2021 |   |
| JP | H0615906 B2 | * | 3/1994 |   |

* cited by examiner

*Primary Examiner* — Laura Martin
*Assistant Examiner* — Nashmiya S Fayyaz
(74) *Attorney, Agent, or Firm* — Woodard, Emhardt, Henry, Reeves & Wagner, LLP

(57) ABSTRACT

A piston pin hole friction and wear test and torque measurement device in power machinery field, comprising a driving system, a torque measurement system, a loading system, a temperature control system, an oil supply system and a central controller. The driving system simulates the oscillation of the connecting rod. The loading system simulates the time-varying cylinder pressure load. The oil supply system and the oil channels of the connecting rod, bushing, and piston pin simulate the oil supply state. The torque measurement system comprises a total friction torque measurement device and a small head bushing hole friction torque measurement device, and measures the friction torque at the piston pin seat hole and the piston pin small head hole in real time. The temperature control system simulates the thermal load. The present application carries out tests based on actual components and realizes real-time measurement of friction torques.

3 Claims, 4 Drawing Sheets

PISTON PIN HOLE FRICTION AND WEAR TEST AND TORQUE MEASUREMENT DEVICE

FIELD OF THE DISCLOSURE

The present application relates to a measurement device in the field of power machinery technology, in particular to a piston pin hole friction and wear test and torque measurement device for actual components of engines.

BACKGROUND

In an internal combustion engine, as a key component for transmitting combustion pressure, the piston pin matches, contacts, and moves relative to the piston pin seat hole, and the connecting rod small end hole, forming a piston pin-hole ternary oscillatory friction pair. This friction pair is exposed to harsh working conditions such as high temperature and high load for long durations, resulting in more than a 10% friction power consumption and has a significant impact on the reliability of the whole machine. More importantly, under harsh working conditions, the piston pin, the pin seat hole, and the connecting rod small head hole will all suffer severe wear, which will increase the matching clearance between the piston pin and the holes, further leading to increased vibration and noise of the whole machine. Therefore, it is of great significance to improve the service life of the engine to carry out friction and wear tests in the development stage of the piston pin and study the friction torque, wear amount and other parameters of the piston pin-hole oscillatory pair under actual working conditions.

When conducting friction and wear tests, the tests are mainly divided into material level tests and component level tests. In material-level friction and wear tests, test pieces need to be taken from real piston pins, pistons, and connecting rod bushings, and the tests are carried out using standard friction and wear testing machines. Such a method is difficult to simulate the actual relative oscillation of the connecting rod and piston pin, as well as actual working conditions such as temperature and load. Component-level tests can be based on complete engine components to simulate the oscillation of piston pins or connecting rods to carry out friction and wear tests. However, current piston pin friction and wear testing devices often can only carry out wear tests, that is, the test pieces are removed after the test to measure the wear amount. It is difficult to obtain the friction torque in real time during the test, and it is even more difficult to obtain the friction torque at the piston pin-small head bushing hole and the piston pin seat hole respectively.

In addition, in high-strength marine engines, the lubricating oil needs to be transferred through the crankshaft oil channel-connecting rod oil channel-bushing oil channel-piston pin oil channel-pin seat oil channel pathway. Few test benches can simulate this process. Therefore, the lubrication conditions between the piston pin-pin seat hole and the piston pin-small head hole during the tests are quite different from the actual working conditions.

SUMMARY OF THE INVENTION

In view of the shortcomings in the prior art, the present application proposes a piston pin hole friction and wear test and torque measurement device, which carries out piston pin friction and wear tests based on actual engine components and realizes real-time measurement of the friction torques at the piston pin seat hole and at the piston pin small head hole.

The technical solution provided by the present application is as follows. The present application comprises a driving system, a loading system, a friction torque measurement system, an oil supply system, a T-slot table and a support table; wherein a bottom of the support table is fixedly connected to a top of the T-slot table, and the friction torque measurement system comprises a total friction torque measurement device and a small head hole friction torque measurement device.

The driving system comprises a rocker arm, an eccentric disc, a transmission shaft, a second bearing base, a flywheel, a first fixing bracket, a second fixing bracket, a first transmission gear, a synchronous belt, a driving motor, a second transmission gear, a first bearing base, wherein the driving motor is fixed to the top of the table by a fixing device, and a bottom of the first fixing bracket, a bottom of the second fixing bracket are both fixedly connected to the T-slot table, and the first bearing base and the second bearing base are respectively mounted on a top of the first fixing bracket and a top of the second fixing bracket, and the second transmission gear is arranged at a middle position of the transmission shaft, and one end of the transmission shaft connects to the flywheel after passing through the first bearing base, while another end of the transmission shaft passes through the second bearing base and connects to the eccentric disc, and an output shaft of the eccentric disc matches a driving groove at a bottom of the rocker arm, and the first transmission gear is connected to an output shaft of the driving motor, and the first transmission gear and the second transmission gear are connected by the synchronous belt.

The loading system comprises a fixing sleeve, a compensation arm, and a hydraulic cylinder, wherein a bottom of the fixing sleeve is fixedly connected to a top of the supporting table, and a bottom of the hydraulic cylinder is fixedly connected to a top of the compensation arm.

The total friction torque measuring device comprises a torque sensor, a cantilever support bracket, a piston pin test piece, a piston test piece, a connecting rod test piece, wherein the cantilever support bracket is fixedly connected to the fixing sleeve, and the piston pin test piece is arranged in the piston test piece after passing through a top circular hole of the connecting rod test piece, and a bottom of the torque sensor is fixedly connected to a top of the cantilever support bracket, and an output shaft at one side of the torque sensor is connected to a top of the rocker arm through a flat key, an output shaft at another side is connected to the piston pin test piece, and the piston test piece is arranged in the fixing sleeve, and a bottom of the compensation arm is in direct contact with a top surface of the piston pin test piece.

The small head hole friction torque measuring device comprises a support shaft, needle roller retainer assemblies, sensor mounting brackets, support shaft bases, and two-dimensional load sensors, wherein bottoms of two sensor mounting brackets are fixedly connected to the top of the support table, and the needle roller retainer assemblies are arranged on the top of the support table, and the support shaft bases are arranged respectively on two needle roller retainer assemblies, and two two-dimensional load sensors are respectively arranged inside the two sensor mounting brackets, and the support shaft passes through the two shaft support bases and a bottom of the connecting rod test piece, and the two sensor mounting brackets, the two shaft support bases are arranged respectively at two sides of the connecting rod test piece, and two ends of the support shaft are respectively connected to the two two-dimensional load sensors.

The oil supply system comprises an oil pump, an oil tank, and an oil delivery pipeline, wherein the oil pump and the oil tank are both fixedly arranged at the top of the T-slot table, and an oil inlet of the oil pump is connected to the oil tank through the oil delivery pipeline, while an oil outlet of the oil pump is connected to an internal oil channel of the support shaft through the oil delivery pipeline, and the internal oil channel of the support shaft is connected to an oil channel of the connecting rod.

Furthermore, the present application also comprises a temperature control system, wherein the temperature control system comprises an electromagnetic heating wire device and a temperature sensor, both of which are installed inside the piston pin test piece.

Furthermore, the present application also comprises a central controller, which comprehensively collects displacement, flow rate, temperature, and load sensor information, to achieve matched control of a movement process, a loading process, a heating process, and an oil supply process.

Furthermore, in the present application, the first fixing bracket, the second fixing bracket, the support table and the T-slot table are connected by bolts, and the sensor mounting brackets and the support table are connected by bolts, and the cantilever support bracket and the fixing sleeve are connected by bolts, and the hydraulic cylinder and the compensation arm are connected by bolts.

Compared with the prior art, the beneficial effects of the present invention are: Firstly, the present application utilizes the principle of interaction force to convert the friction force on the measuring pin into the friction force on the measuring connecting rod, enabling the device to simultaneously measure the total friction torque at the piston pin-hole (pin seat hole, connecting rod hole) positions and the total friction torque at the small end of the connecting rod. The difference between the two can be obtained to acquire the friction torque at the piston pin-pin seat, so that the friction torque curves of the small head hole and the pin seat hole can be obtained simultaneously during the test.

Secondly, the application uses structural design to make the oil circuit configuration aligned with the piston pin lubrication oil circuit in the actual engine, that is, from the crankshaft to the connecting rod, then to the piston pin, and finally to the piston pin seat, which simulates the actual oil supply state of the piston pin using pressure lubrication, and directly carries out experiments based on one-to-one components, especially providing strong support for the study of the piston pin-hole oscillation friction pair of high-power and high-strength engines.

Thirdly, the present application coordinates various systems by introducing a central controller, which simulates time-varying loads, time-varying temperatures, and time-varying oil supply states, thereby simulating the actual operating conditions of the engine during operation to the greatest extent.

wherein, 1. Torque sensor, 2. Support shaft, 3. Cantilever support bracket, 4. Rocker arm, 5. Eccentric disc, 6. Transmission shaft, 7. Second bearing base, 8. Flywheel, 9. T-slot table, 10. First fixing bracket, 11. Second fixing bracket, 12. First transmission gear, 13. Synchronous belt, 14. Driving motor, 15. Needle roller retainer assembly, 16. Oil pump, 17. Supporting table, 18. Oil tank, 19. Oil delivery pipeline, 20. Sensor mounting bracket, 21. Supporting shaft base, 22. Two-dimensional load sensor, 23. Fixing sleeve, 24. Compensation arm, 25. Hydraulic cylinder, 26. Electromagnetic heating wire device, 27. Piston pin test piece, 28. Piston test piece, 29. Connecting rod test piece, 30. Second transmission gear, 31. First bearing base.

DESCRIPTION OF THE ILLUSTRATED EMBODIMENTS

The following is a detailed description of an embodiment of the present application in conjunction with the accompanying drawings. This embodiment is based on the technical solution of the present invention and provides a detailed implementation method and a specific operation process, but the protection scope of the present invention is not limited to the following embodiment.

Embodiment 1

Figure 1:
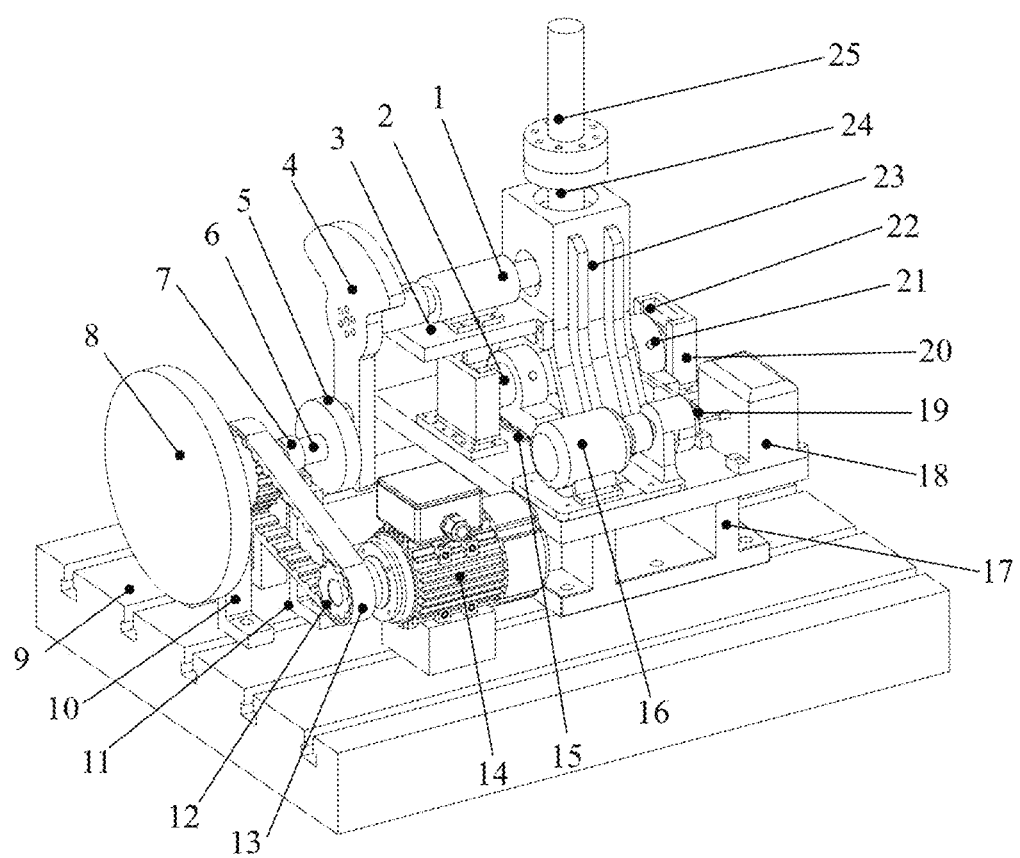
FIG. 1 is a schematic diagram of the overall structure of an embodiment of the present invention.
Figure 2:
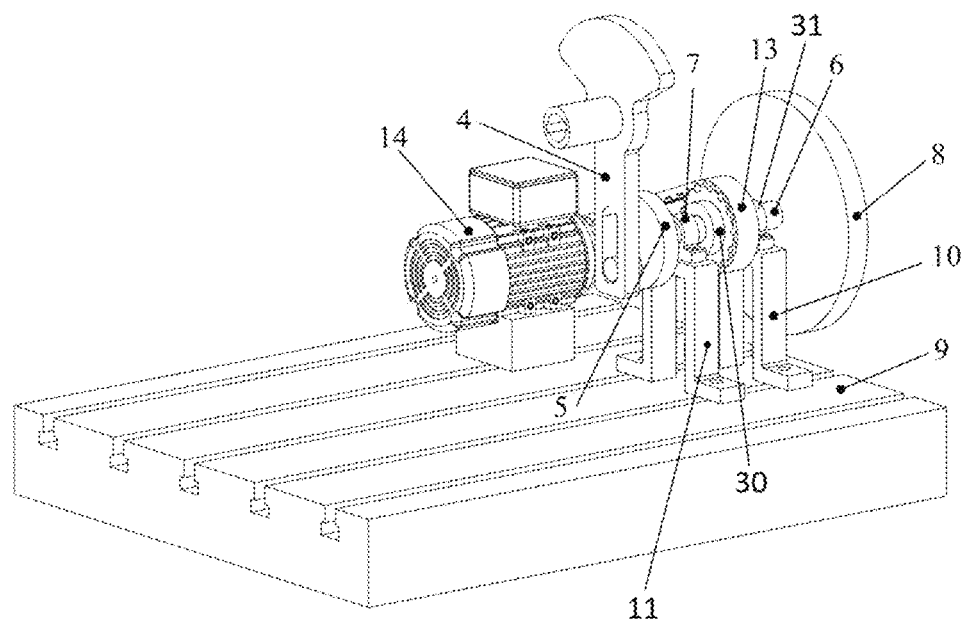
FIG. 2 is a schematic diagram of the structure of the driving system in an embodiment of the present invention.
Figure 3:
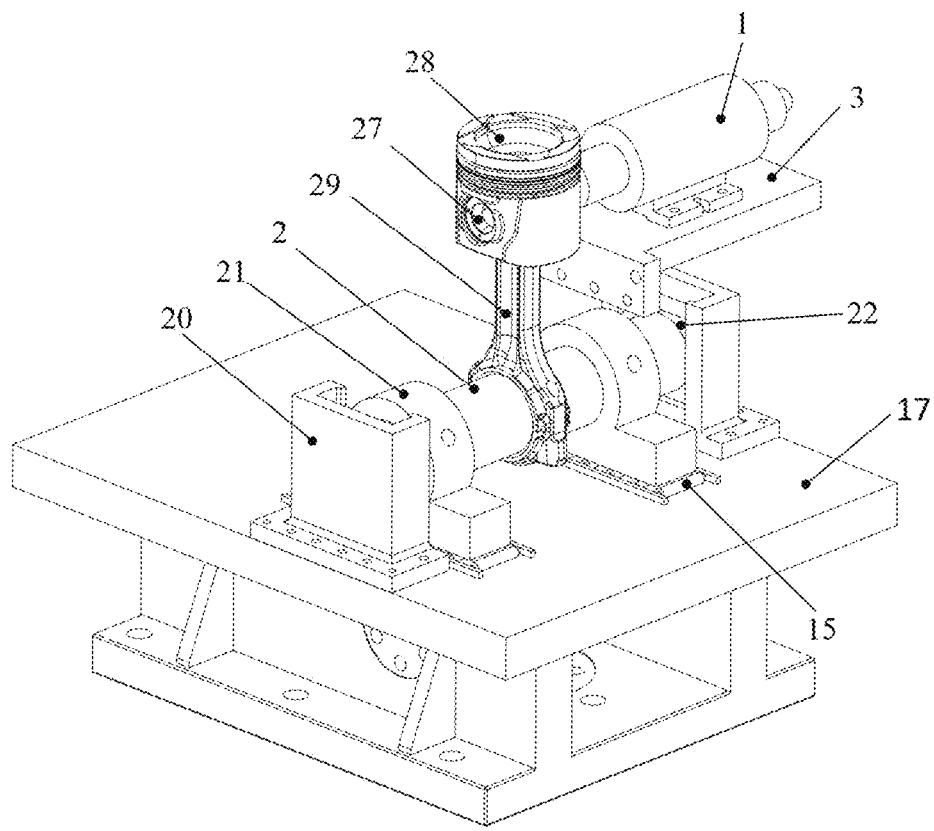
FIG. 3 is a structural schematic diagram of a friction torque measurement system in an embodiment of the present invention.
Figure 4:
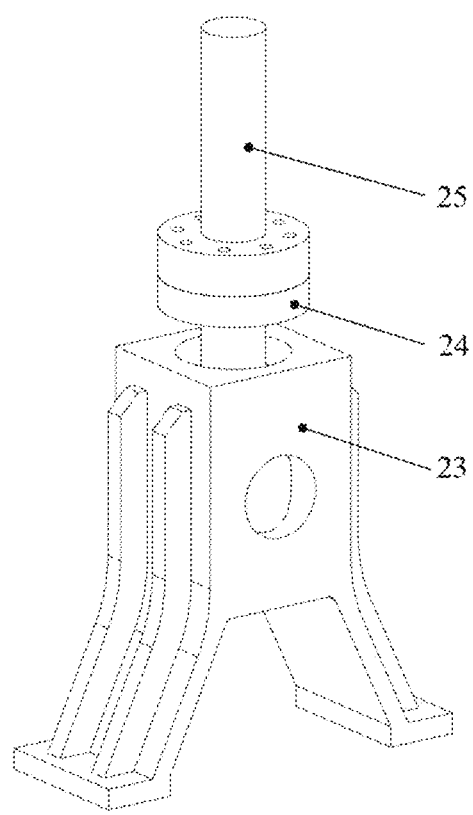
FIG. 4 is a schematic diagram of the structure of a loading system in an embodiment of the present invention.
Figure 5:
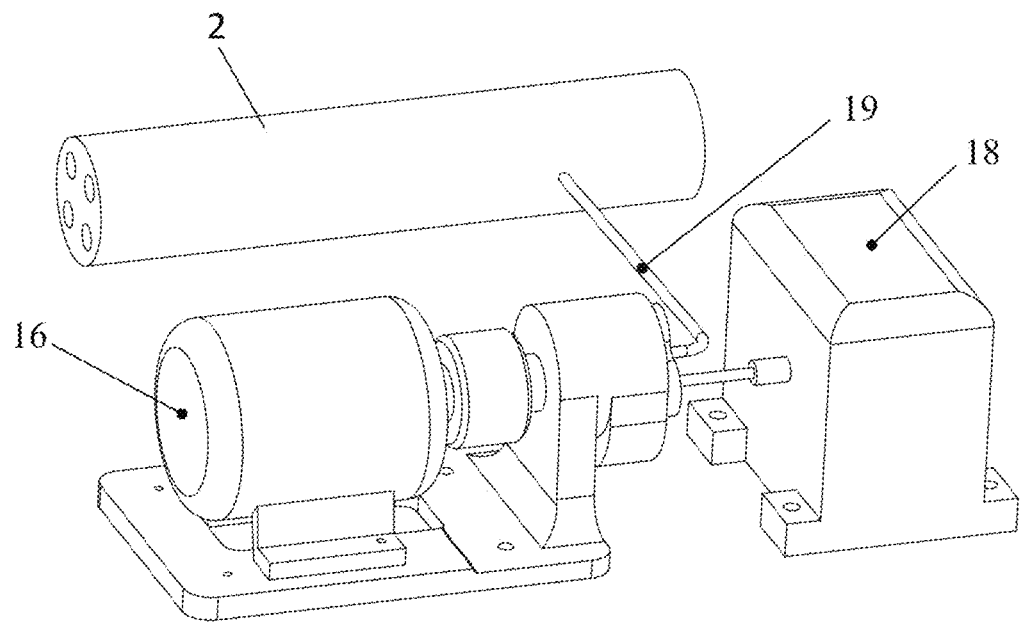
FIG. 5 is a structural schematic diagram of the oil supply system in an embodiment of the present invention.
Figure 6:
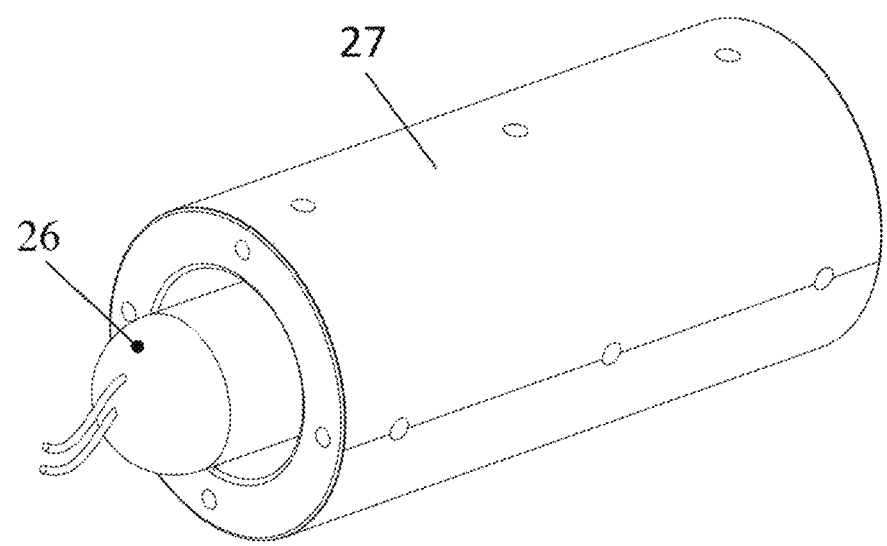
FIG. 6 is a structural schematic diagram of a temperature control system in an embodiment of the present invention.

The structure of the present application is shown in FIG. 1 to FIG. 6. The present application comprises a driving system, a loading system, a friction torque measuring system, an oil supply system, a temperature control system, a central controller, a T-slot table 9 and a support table 17. The bottom of the support table 17 is fixed to the top of the T-slot table 9 by bolts. The friction torque measurement system comprises a total friction torque measurement device and a small head hole friction torque measurement device.

The driving system comprises a rocker arm 4, an eccentric disc 5, a transmission shaft 6, a second bearing base 7, a flywheel 8, a first fixing bracket 10, a second fixing bracket 11, a first transmission gear 12, a synchronous belt 13, a driving motor 14, a second transmission gear 30, a first bearing base 31. The driving motor 14 is fixed by a fixing device to the top of the T-slot table 9. The bottom of the first fixing bracket 10 and the second fixing bracket 11 are fixed to the top of the table 9 by bolts. The first bearing base 31 and the second bearing base 7 are respectively mounted on the top of the first fixing bracket 10 and on the top of the second fixing bracket 11. The second transmission gear 30 is arranged at a middle position of the transmission shaft 6. One end of the transmission shaft 6 connects to the fly wheel 8 after passing through the first bearing base 31, while the other end of the transmission shaft 6 connects to the eccentric disc 5 after passing through the second bearing base 7. The output shaft of the eccentric disc 5 matches a driving groove at the bottom of the rocker arm 4. The first transmission gear 12 is connected to the output shaft of the driving motor 14. The first transmission gear 12 and the second transmission gear 30 are connected by the synchronous belt 13.

The loading system comprises a fixing sleeve 23, a compensation arm 24 and a hydraulic cylinder 25. The bottom of the fixing sleeve 23 is fixed to the top of the support table 17 by bolts. The bottom of the hydraulic cylinder 25 is fixed to the top of the compensation arm 24 by bolts.

The total friction torque measurement device comprises a torque sensor 1, a cantilever support bracket 3, a piston pin test piece 27, a piston test piece 28 and a connecting rod test piece 29. The cantilever support bracket 3 is connected to the fixing sleeve 23 by bolts. The piston pin test piece 27 is arranged in the piston test piece 28 after passing through a top circular hole of the connecting rod test piece 29. The bottom of the torque sensor 1 is fixed to the top of the cantilever support bracket 3. The output shaft at one side of the torque senor 1 is connected to the top of the rocker arm 4 through a flat key, and the output shaft at the other side is connected to the piston pin test piece 27. The piston test piece 28 is arranged in the fixing sleeve 23. The bottom of the compensation arm 24 is in direct contact of the top surface of the piston pin test piece 27.

The small head hole friction torque measuring device comprises a support shaft 2, needle roller retainer assemblies 15, sensor mounting brackets 20, support shaft bases 21, and two-dimensional load sensors 22. The bottoms of two sensor mounting brackets 20 are both fixed to the top of the support table 17 by bolts. The needle roller retainer assemblies 15 are all arranged on the top of the support table 17. The support shaft bases 21 are arranged respectively on the two needle roller retainer groups 15. Two two-dimensional load sensors 22 are arranged respectively inside two sensor mounting brackets 20. The support shaft 2 passes through two shaft support bases 21 and the bottom of the connecting rod test piece 29. Two sensor mounting brackets 20 and two shaft support bases 21 are arranged respectively at two sides of the connecting rod test piece 29. The two ends of the support shaft 2 are respectively connected to the two two-dimensional load sensors 22.

The oil supply system comprises an oil pump 16, an oil tank 18, and an oil delivery pipeline 19. The oil pump 16 and the oil tank 18 are both fixedly arranged on the top of the T-slot table 9. The oil inlet of the oil pump 16 is connected to the oil tank 18 through the oil delivery pipeline 19. The oil outlet of the oil pump 16 is connected to the internal oil channel of the support shaft 2 through the oil delivery pipeline 19. And the internal oil channel of the support shaft 2 is connected to the oil channel of the connecting rod 29.

The temperature control system comprises an electromagnetic heating wire device 26 and a temperature sensor. Both are installed inside the piston pin test piece 27. The central controller comprehensively collects information of displacement, flow rate, temperature and load sensors to achieve matched control of the movement process, the loading process, the heating process and the oil supply process.

In the present application, the driving system can simulate the oscillation of the connecting rod relative to the piston pin under actual working conditions, and the loading system is used to simulate the time-varying cylinder pressure load on the top of the piston, and the oil supply system together with the oil channels of the connecting rod, the bushing, and the piston pin simulate the oil supply state under actual working conditions, and the torque measurement system is composed of a total friction torque measuring device and a small head bushing hole friction torque measuring device, which can measure the friction torque at the piston pin-pin seat hole and the piston pin-small head hole in real time during the test, and the temperature control system is used to simulate the thermal load at the piston pin hole.

In the implementation process of the present application, driven by the driving motor 14, the transmission shaft 6 further drives the flywheel 8 and the eccentric disc 5 to rotate and eventually drives the rocker arm 4 to oscillate. The motor can be controlled based on a transmission ratio conversion to make the oscillation frequency of the rocker arm 4 aligned with the actual engine. The output shaft at one side of the torque sensor 1 is connected to the rocker arm 4 through a flat key. The output shaft at the other side is connected to the piston pin test piece 27 under test. The driving torque of the piston pin test piece 27 during the oscillation process can be measured. At a specific rotary speed, the total friction torque acting on the piston pin test piece 27 can be easily obtained by dynamic analysis of the piston pin test piece 27.

The support shaft 2 matches with the large end hole of the connecting rod to support the load transmitted downward from the top, and shaft support bases 21 are installed on it. The bottoms of the bases contact with the needle roller retainer assemblies 15, ensuring that it is only subject to normal loads. The oil outlet of the oil pump 16 is connected to the internal oil channel of the support shaft 2 via the oil delivery pipeline 19. The internal oil channel of the support shaft 2 is connected to the oil channel of the connecting rod 29. So that lubricating oil is supplied to the connecting rod small end, and to the pin seat along the oil channel that passes through the piston pin test piece 27. The lubrication method of the piston pin in some high-strength engines can be simulated. The temperature control system comprises an electromagnetic heating wire device 26 and a temperature sensor, both of which are installed inside the piston pin test piece 27. The piston pin can be heated and maintained at a specified temperature. The central controller comprehensively collects displacement, flow rate, temperature, and load sensor information to achieve matched control of the motion process, the loading process, the heating process, and the oil supply process, simulating the working conditions of the piston pin-hole in an actual engine.

In the implementation process of the present application, the total friction torque measuring device can measure the total torque required to drive the piston pin to rotate according to specific laws, and its value is equal to the sum of the piston pin rotation inertia torque and the friction torque. The friction torque comes from the piston pin-pin seat hole and the piston pin-small head hole pairs. It is not possible to obtain specific values for both respectively via only one torque sensor 1. In the small head bushing hole friction torque measurement device, the sensor mounting brackets 20 are fixed onto the table by bolts. Two-dimensional load sensors 22 are installed inside, and the load sensors are connected to the support shaft 2 by bolts. When the pin test piece 27 rotates driven by the driving system, the friction torque induces a rotational tendency in the connecting rod 29. The two-dimensional load sensor is convenient to obtain the value of the support reaction force. By carrying out static balance analysis on the connecting rod 29, the friction torque at the small head can be obtained. The friction torque at the piston pin seat hole can be obtained by subtracting the total friction torque by the friction torque at the small head hole.

The above embodiments are only used to illustrate the configuration principle and implementation of the present application, and are not intended to limit the present application. Anyone familiar with the technology may modify or alter the above embodiments without departing from the spirit and scope of the present application. Therefore, all equivalent modifications or alterations made by a person skilled in the art without departing from the spirit and technical concept disclosed by the present application shall still be covered by the claims of the present application.

The invention claimed is:

1. A piston pin hole friction and wear test and torque measurement device, characterized by comprising
a driving system, a loading system, a friction torque measurement system, an oil supply system, a T-slot table (9) and a support table (17); wherein
a bottom of the support table (17) is fixedly connected to a top of the T-slot table (9), and the friction torque measurement system comprises a total friction torque measurement device and a small head hole friction torque measurement device; and
the driving system comprises a rocker arm (4), an eccentric disc (5), a transmission shaft (6), a second bearing base (7), a flywheel (8), a first fixing bracket (10), a second fixing bracket (11), a first transmission gear (12), a synchronous belt (13), a driving motor (14), a second transmission gear (30), a first bearing base (31), wherein the driving motor (14) is fixed to the top of the T-slot table (9) by a fixing device, and a bottom of the first fixing bracket (10), a bottom of the second fixing bracket (11) are both fixedly connected to the T-slot table (9), and the first bearing base (31) and the second bearing base (7) are respectively mounted on a top of the first fixing bracket (10) and a top of the second fixing bracket (11), and the second transmission gear (30) is arranged at a middle position of the transmission shaft (6), and one end of the transmission shaft (6) connects to the flywheel (8) after passing through the first bearing base (31), while another end of the transmission shaft (6) connects to the eccentric disc (5) after passing through the second bearing base (7), and an output shaft of the eccentric disc (5) matches a driving groove at a bottom of the rocker arm (4), and the first transmission gear (12) is connected to an output shaft of the driving motor (14), and the first transmission gear (12) and the second transmission gear (30) are connected by the synchronous belt (13); and
the loading system comprises a fixing sleeve (23), a compensation arm (24), and a hydraulic cylinder (25), wherein a bottom of the fixing sleeve (23) is fixedly connected to a top of the supporting table (17), and a bottom of the hydraulic cylinder (25) is fixedly connected to a top of the compensation arm (24); and
the total friction torque measuring device comprises a torque sensor (1), a cantilever support bracket (3), a piston pin test piece (27), a piston test piece (28), a connecting rod test piece (29), wherein the cantilever support bracket (3) is fixedly connected to the fixing sleeve (23), and the piston pin test piece (27) is arranged in the piston test piece (28) after passing through a top circular hole of the connecting rod test piece (29), and a bottom of the torque sensor (1) is fixedly connected to a top of the cantilever support bracket (3), and an output shaft at one side of the torque sensor (1) is connected to a top of the rocker arm (4) through a flat key, an output shaft at another side is connected to the piston pin test piece (27), and the piston test piece (28) is arranged in the fixing sleeve (23), and a bottom of the compensation arm (24) is in direct contact with a top surface of the piston pin test piece (27); and
the small head hole friction torque measuring device comprises a support shaft (2), needle roller retainer assemblies (15), sensor mounting brackets (20), support shaft bases (21), and two-dimensional load sensors (22), wherein bottoms of two sensor mounting brackets (20) are fixedly connected to the top of the support table (17), and the needle roller retainer assemblies (15) are arranged on the top of the support table (17), and two support bases (21) are arranged respectively on two needle roller retainer assemblies (15), and two two-dimensional load sensors (22) are respectively arranged inside the two sensor mounting brackets (20), and the support shaft (2) passes through the two shaft support bases (21) and a bottom of the connecting rod test piece (29), and the two sensor mounting brackets (20), the two shaft support bases (21) are arranged respectively at two sides of the connecting rod test piece (29), and two ends of the support shaft (2) are respectively connected to the two two-dimensional load sensors (22); and
the oil supply system comprises an oil pump (16), an oil tank (18), and an oil delivery pipeline (19), wherein the oil pump (16) and the oil tank (18) are both fixedly arranged at the top of the T-slot table (9), and an oil inlet of the oil pump (16) is connected to the oil tank (18) through the oil delivery pipeline (19), while an oil outlet of the oil pump (16) is connected to an internal oil channel of the support shaft (2) through the oil delivery pipeline (19), and the internal oil channel of the support shaft (2) is connected to an oil channel of the connecting rod test piece (29).

2. The piston pin hole friction and wear test and torque measurement device according to claim 1, characterized by further comprising
a temperature control system, wherein the temperature control system comprises an electromagnetic heating wire device (26) and a temperature sensor, both of which are installed inside the piston pin test piece (27).

3. The piston pin hole friction and wear test and torque measurement device according to claim 1, characterized in that
the first fixing bracket (10), the second fixing bracket (11), the support table (17) and the T-slot table (9) are connected by bolts, and the two sensor mounting brackets (20) and the support table (17) are connected by bolts, and the cantilever support bracket (3) and the fixing sleeve (23) are connected by bolts, and the hydraulic cylinder (25) and the compensation arm (24) are connected by bolts.

* * * * *